United States Patent [19]
Thomas et al.

[11] Patent Number: 6,038,288
[45] Date of Patent: Mar. 14, 2000

[54] SYSTEM AND METHOD FOR MAINTENANCE ARBITRATION AT A SWITCHING NODE

[76] Inventors: Gene Gilles Thomas, 103 Esk Ct.; Phyllis Page, 106 Prestwick Pl., both of Cary, N.C. 27511

[21] Appl. No.: 09/002,111

[22] Filed: Dec. 31, 1997

[51] Int. Cl.$^7$ .................................................. H04M 1/24
[52] U.S. Cl. ................................ 379/15; 379/9; 379/32; 370/244
[58] Field of Search ........................ 379/1, 9–11, 15, 379/32, 34; 370/244, 252

[56] References Cited

U.S. PATENT DOCUMENTS

| | | | |
|---|---|---|---|
| 5,293,556 | 3/1994 | Hill et al. ................................ | 379/10 |
| 5,384,822 | 1/1995 | Brown et al. ............................ | 379/10 |
| 5,384,823 | 1/1995 | Brenski et al. .......................... | 379/10 |
| 5,392,328 | 2/1995 | Schmidt et al. ......................... | 379/10 |
| 5,570,410 | 10/1996 | Hooshiari ................................ | 379/9 |
| 5,712,896 | 1/1998 | Lee et al. ................................ | 379/10 |
| 5,848,128 | 12/1998 | Frey ......................................... | 379/9 |
| 5,883,939 | 3/1999 | Friedman et al. ....................... | 379/9 |

*Primary Examiner*—Paul Loomis
*Attorney, Agent, or Firm*—Finnegan, Henderson, Farabow, Garrett & Dunner, L.L.P.

[57] ABSTRACT

A system and method for providing maintenance arbitration at a switching node connected to a public carrier network. The system provides localized maintenance, fault toleration, proactive diagnostics, platform independence, and rule-based code behavior modification to deliver the best service possible based on the service capability and fault condition of switching node components.

43 Claims, 6 Drawing Sheets

```
CM      MS    IOD   Net    PM      CCS   Lns    Trks    Ext    APPL
CM Flt  RExByp QM   B Istb 1LTC                 24 CC
 M                         "C"                   "C"
LTC                        SysB  ManB  OffL    CBsy    ISTb   Insv
 0 Quit     PM              0     2     17      0       14     1
 2 Post_    LTC             0     2      1      0        5     0
 3 ListSet
 4          LTC       5 ISTb Links_OOS: CSide 0 , PSide 0
 5 Trnsl_   Unit0:    Act   ISTb
 6 Tst_     Unit1:    Inact ManB
 7 Bsy_     QueryPM   flt
 8 RTS_     Node is ISTb
 9 offL        Inactive Unit out of service
10 LoadPM_     One or both Units inservice trouble
11 Disp_    Unit 0
12 Next     The following inservice troubles exist:
13 SWAct       MtcArb detected fault in unit
14 QueryPM     Severe service degradation in unit
15          The following cards should be replaced:
16          Site Flr RPos Bay_id  Shf  Description        Slot   EqPEC
17 Perform  HOST 01  ZZ02 LTE     03   18  LTC : 005       15    6x92
18          Unit 1
  TEAM 7      not SysB or ISTb
                 No service degradation in unit Time 08:17
```

SYSTEM AND METHOD FOR MAINTENANCE ARBITRATION AT A SWITCHING NODE

BACKGROUND OF THE INVENTION

The present invention relates generally to network switching nodes, and more particularly, to a maintenance arbitration system and method that provides localized node maintenance using fault toleration, proactive diagnostics, platform independence, and rule-based code behavior modification.

With the sharp increase in public switched telephone network (PSTN) usage for both voice and data transmission, switching node technology must constantly improve to handled escalated service demands. Manufacturers endeavor to produce network switching node devices that meet reasonable reliability and service objectives while effectively supporting increased usage with minimal downtime and service problems. For example, if overloaded due to a high volume of PSTN usage, a switching node could fail, requiring calls handled by the node to be re-routed over the network. This downtime can be costly for end-offices (e.g., a telephone company), in that determining the source of, and troubleshooting, the problem can take hours and even days. In addition, the end-office must maintain back-up systems to prevent any loss of service to their customers.

One solution currently adopted by switch manufacturers involves adding both hardware and software maintenance features to the switch to simplify the troubleshooting efforts of technicians. These features include the development of complex alarm systems that notify technicians when a switching node component fails and identifies potential causes of the failure. With respect to the latter feature, manufacturers rely on dedicated software solutions designed to locate operation faults within a specific switching node component.

Although the above-noted maintenance features provide temporary solutions, end-offices continue to experience switching node failure and often encounter new problems, often as a result of faulty maintenance software. For example, currently adopted software solutions typically include bugs that are difficult to locate and fix. In addition, since new maintenance problems constantly arise, maintenance software must be periodically updated to address the new problems. This presents a further problem since current maintenance software is not readily upgradable. Consequently, multiple software versions and applications need to be developed to preserve the maintenance integrity of the switching node. Maintaining multiple software versions and applications can be very costly and require specialized technicians familiar with the multiple software versions to troubleshoot a diagnosed problem. Thus, due to the lack of coherent maintenance architecture, the maintenance system itself may cause problems in the switching node ultimately resulting in service downtime.

Other maintenance solutions developed by switching node manufacturers are designed to troubleshoot switch maintenance problems at a high level in the system architecture. That is, current maintenance solutions typically are directed to diagnosing a problem at a switch controller level instead of at a lower peripheral module level. Certainly, lower level switching node components are more intricate and more difficult to diagnose when experiencing a fault condition. Nevertheless, a maintenance system should be capable of continuously monitoring lower level switching node components to quickly diagnose any fault conditions that could affect the overall integrity of the node.

Therefore, it is desirable to provide localized node maintenance arbitration that is capable of quickly detecting and diagnosing a problem of sufficient granularity so as to isolate the problem to a minimum set of components.

It is also desirable to provide a node maintenance system that identifies symptoms associated with specific trouble conditions, and that offers proactive diagnostics to isolate and react to a trouble condition such that the impact on the node's ability to meet service and reliability objectives is minimized.

It is further desirable to provide a node maintenance framework, using a generic software solution, that can be employed in a variety of network nodes to reduce maintenance system costs.

It is also desirable to provide a node maintenance system that utilizes a rule-based software solution that allows modifications to software behavior without requiring modification to software code.

It is further desirable to provide a node maintenance system that is capable of tolerating certain trouble conditions if the node's operation would be more severely degraded by the corrective action.

It is also desirable to provide a node maintenance system that can automatically configure its software based on the physical components of the node.

Additional desires, features and advantages of the invention will be set forth in the following description, and will be apparent from description or may be learned by practicing the invention.

SUMMARY OF THE INVENTION

Systems and methods consistent with the present invention meet these desires by providing localized node maintenance using proactive diagnostics, fault toleration, platform independence, rule-based software behavior modification, and dynamic software configuration.

A system for providing localized maintenance arbitration at a switching node having a plurality of components comprises means for determining a service capability associated with a component of the switching node; means for reporting the service capability to a controlling device; and means for modifying the operation state of the component based on the reported service capability of the component.

A method for providing localized maintenance arbitration at a switching node having a plurality of components comprises the steps of determining a service capability associated with a component of the switching node; reporting the service capability to a controlling device; and modifying the operation state of the component based on the reported service capability of the component.

Both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of the specification, illustrate presently preferred embodiments of the invention and, together with the preceding general description and the following detailed description, explain the principles of the invention.

In the drawings.

DETAILED DESCRIPTION OF THE INVENTION

Reference will now be made in detail to the construction and operation of preferred embodiments consistent with the present invention that are illustrated in the accompanying drawings. In those drawings, like elements and operations are designated with the same reference numbers.

Figure 1:
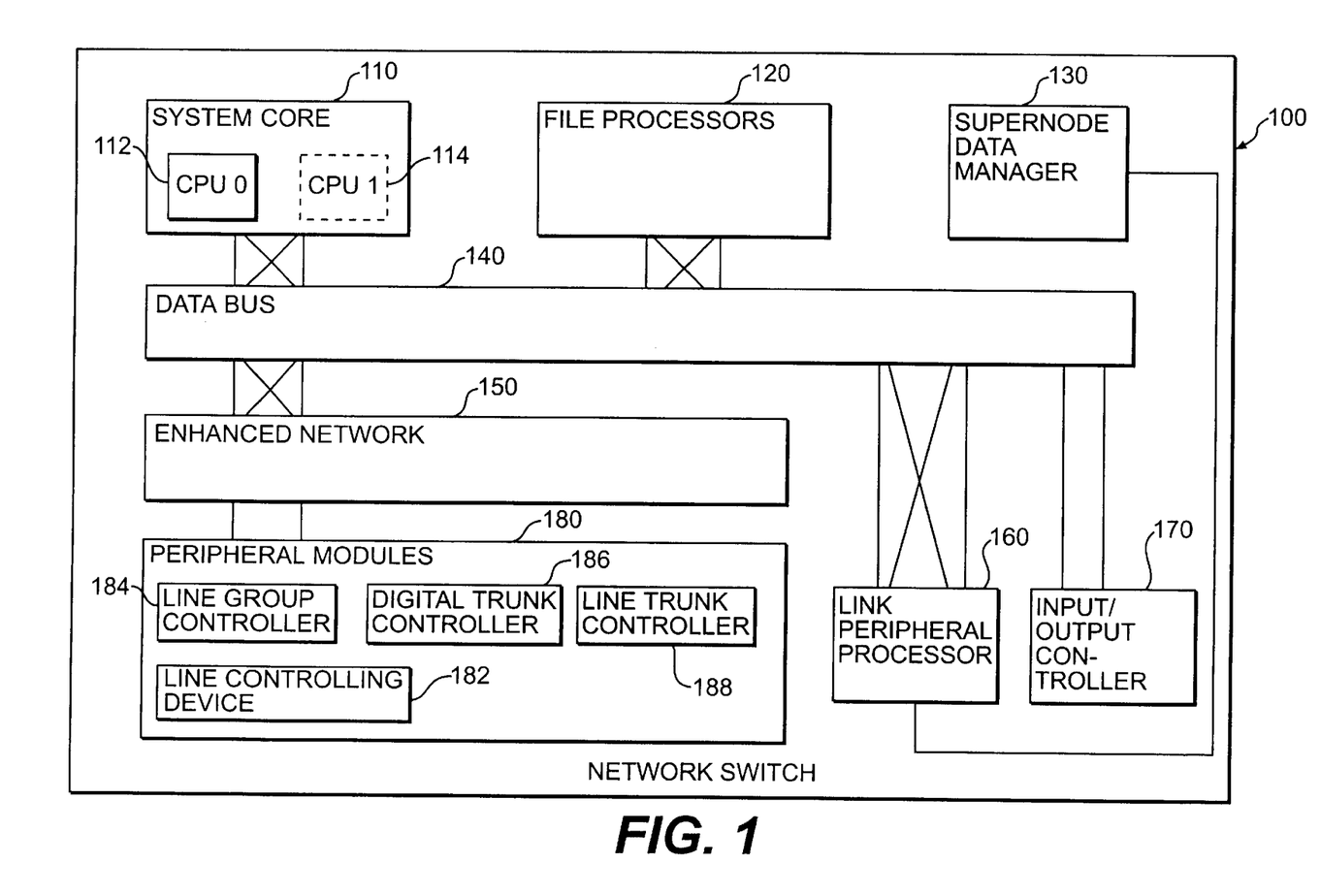
FIG. 1 is a block diagram of a network switch supporting maintenance arbitration functionality consistent with the present invention.

FIG. 1 is a block diagram of a network switch 100 supporting maintenance arbitration functionality consistent with the present invention. Switch 100 connects to a communications network (e.g., PSTN) and operates to route voice and data signals between multiple end users. Switch 100 can be any switch within the communications network, such as an end-office switch located at a telephone company. Preferably, switch 100 is a DMS Switch manufactured by Nortel.

Switch 100 includes a set of networked components or nodes each having units that include a central processing unit (CPU), memory, and interfaces to other nodes. Many of the nodes of switch 100 are duplicated along with the connections between the nodes. Thus, when duplicated nodes are connected, each unit of one node is connected to each unit of the other node resulting in four connections between the node units. In FIG. 1, the duplicated nodes are represented as a first node (i.e., clear box) and a second node (i.e., gray box). The redundancy gives switch 100 a high degree of reliability and fault tolerance. It also allows operators to perform maintenance and upgrades without disrupting service.

Switch 100 components can be grouped into three layers: service processing, signaling and connectivity, and physical access.

The service processing layer includes system core 110, file processors 120, and supermode data manager 130. These components use commercially available CPUs and storage devices that are upgradable. This layer of components supports high-level call processing for lines and trunks terminating on switch 100, Advanced Intelligent Network (AIN) services, and other centralized control functions.

System core 110 is the computing engine of switch 100. In addition to overall system control, system core 10 provides conventional switched call routing, maintenance, and management functions. Preferably, system core 110 includes a duplicated, high-capacity, single-chip microprocessor (e.g., Motorola MC88110 CPU) with duplicated memory, communication buses, and interfaces to other switch components. For example, in FIG. 1, the first node is shown to include a CPU 0 112 and the second node is shown to include a CPU 1 114. The duplicated CPUs of system core 110 preferably operate in instruction synchronism (i.e., sync-matched operation) with both units executing the same instructions in parallel. One of the CPUs is designated as active while the other CPU operates in hot-standby. Having duplicated CPUs allows system core 110 to remain operable when a fault condition occurs. When the active unit of system core 110 fails, a Switch of Activity (SWACT) occurs, meaning the inactive unit becomes active. In most cases, the node stabilizes within 50 milliseconds and applications are unaware of the fault. Therefore, recovery is completely transparent.

File processors 120 enhance the data management capabilities of switch 100 by providing secondary storage and archive functions. In particular, file processors 120 include an industry-standard serial device interface, a fault tolerant file system, redundant data storage devices, and high-performance methods for relational database access. The duplicated CPUs of file processors 120 preferably are configured for sync-matched operation.

Supernode data manager 130 is a computing server (e.g., Hewlett-Packard Business Server) that provides central operation, administration, maintenance and provisioning services for switch 100. Supernode data manager 130 includes software having maintenance and administration utilities.

The signaling and connectivity layer of switch 100 carries and connects digital traffic across the switch. The layer includes a data bus 140 and an enhanced network 150 for DS0-based service connections. DS0 is a protocol for digital transmission that represents one 64 Kbit/s channel.

Data bus 140 is a high-speed transaction bus that provides message transport functions for the distributed processors of switch 100 and allows nodes to exchange messages with each other. Data bus 140 preferably includes at least two load-sharing planes, each being an independent bus. Each plane has a CPU (e.g., Motorola MC68020 microprocessor), memory, and a set of interfaces to system core 110, file processors 120, and other switch 100 components. Each plane of data bus 140 includes two buses: a transaction bus and a processor bus. The transaction bus carries traffic sent from one node processor to another node processor over data bus 140 and operates at 128 Mbit/s. The processor bus supervises and controls the transaction bus and port interfaces, and carries only the control messages required for data bus 140 operation. The two planes normally operate independently in a load-sharing mode, although each has the connectivity and capacity to support the full load independently.

Enhanced network 150 is a time-division multiplexing switch network that handles call switching and establishes connections between any of the DS0 channels terminating on switch 100. Preferably, enhanced network 150 is a single-stage switch which means that connections are established at a single cross point rather than through a series of switching stages. This single cross point allows any input channel to connect to any output channel in one stage. Enhanced network 150 switches multiple DS0 channels together for higher bandwidth connections. With enhanced network 150, switch 100 can support approximately 128,000 channels. To maintain this switching capacity, enhanced network 150 includes duplicated planes with each plane consisting of one or more shelves. Each plane shelf pairs with a shelf in the other plane and connects to both data bus 140 planes. Preferably, each shelf includes a control processor, memory, port controller and cross point cards, control interfaces to data bus 140, and interfaces to other switch 100 components.

Alternatively, a junctored network may be used in place of enhanced network 150. A junctored network includes duplicated network modules, interconnected by cables, that contain a set of cross points. The junctor network is a four-stage network that has a maximum capacity of 61,440 channels but cannot switch multiple DS0 channels together.

The final layer of switch 100 components is the physical access layer.

This layer includes link peripheral processor 160, input/output controller 170, and peripheral modules 180.

Link peripheral processor 160 terminates a number of link types and implements a variety of protocols to connect switch 100 to external operations and signaling networks. For example, link peripheral processor 160 can link switch 100 to an Ethernet LAN, support automatic directory assistance services, and provide integrated packet switched data handling for ISDN on switch 100. Link peripheral processor 160 includes a load-sharing pair of message switches and message buses along with application specific link interface units (LIUs). A LIU terminates a specific link type and implements its corresponding protocol. Different types of LIUs can be used depending on the functions provided by link peripheral processor 160. For example, the LIU can be an Ethernet Interface Unit that connects switch 100 to an Ethernet LAN.

Input/output controller 170 is the interface from data bus 140 to a variety of serial devices including video display terminals, magnetic tape drives, disk drives, data units, modems, and printers. Input/output controller 170 houses the cards that control the activity of each input/output device and allows each device to communicate with switch 100 components. The video display terminals provide user interfaces for maintenance and administration while the magnetic tape drives provide removable mass storage and retrieval of switch 100 software and data.

Peripheral modules 180 provide an interface between the switching fabric of the signaling and connectivity layer and telephony terminals, such as subscriber lines, analog trunks, or digital trunks. In addition, peripheral modules 180 provide real-time intensive call processing and service-specific protocol handling functions. System core 110 controls peripheral modules 180; however, peripheral modules 180 support system core 110 by providing some of the processing required for call handling as well as line and trunk interfaces. For example, once system core 110 establishes digital connections among peripheral modules 180, the modules can pass voice and data traffic as well as signaling and control messages between each other without supervision from system core 110. Since peripheral modules 180 can be remotely located, the geographic coverage of switch 100 can be extended and the number of lines effectively served by switch 100 can be increased.

Peripheral modules 180 can include line controlling device 182, line group controller 184, digital trunk controller 186, and line trunk controller 188. Other peripheral modules may be used with switch 100 to perform application specific functions.

Line controlling device 182 is an analog service vehicle for switch 100 in that it supports Plain Ordinary Telephone Service (POTS), business telephone sets, and data units, which are interfaces from computer equipment to subscriber lines. Preferably, line controlling device 182 provides A/D and D/A signal processing, line supervision, ringing, loop testing, and multiplexing for digitized subscriber channels. The duplicated units of line controlling device 182 normally operate in a load-sharing mode with each unit supplying processing for half of the DS0 links and half of the DS30A links. The control sections of the line controlling devices interconnect so that either of them can handle all of the DS0 and DS30A links in the event of a failure.

Line group controller 184 controls up to ten line controlling devices and provides terminal processing functions such as channel assignment and supervision. Line group controller 184 also provides tone generation, tone reception, and digit collection. Instead of operating in a load-sharing mode, one line group controller 184 node is active and manages all interfaces while the other is in standby mode ready to assume control in the event the active node fails.

Digital trunk controller 186 supports a variety of interfaces, including DS1 interfaces, and connects switch 100 to digital interoffice carriers. In addition, digital trunk controller 186 provides control bit scanning, insertion operations, and trunk maintenance. This peripheral module can also synchronize switch 100 with an external clock source.

Line trunk controller 186 combines all of the line group controller and digital trunk controller functions. In addition, line trunk controller 186 can support up to 20 links in any combination of DS30A links for line controlling devices 182 and DS1 links for digital carriers.

Figure 2:
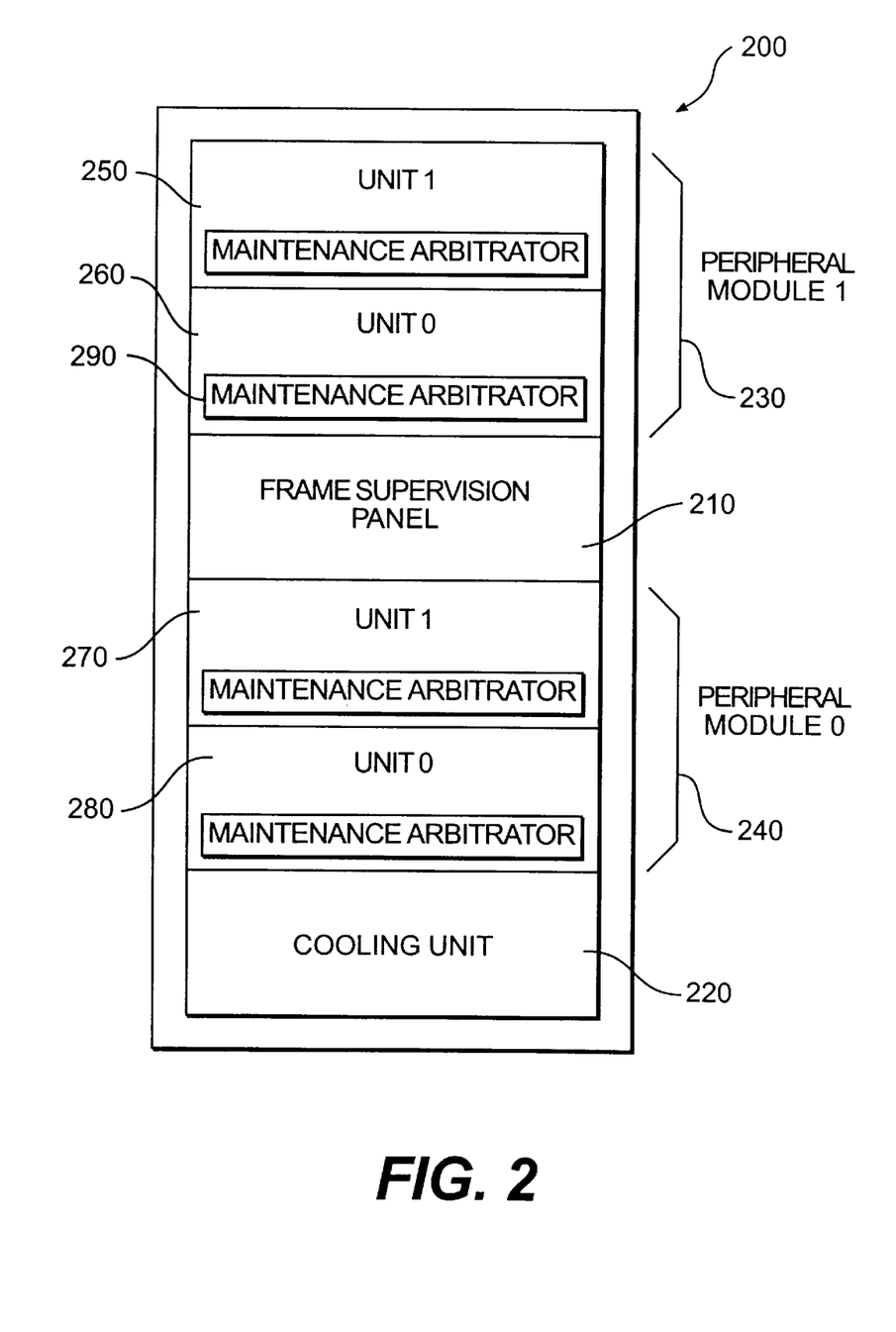
FIG. 2 is a block diagram of a plurality of peripheral modules configured with maintenance arbitration functionality consistent with the present invention.

FIG. 2 is a block diagram of a peripheral module unit 200 configured with maintenance arbitration functionality consistent with the present invention. Peripheral module unit 200 combines a frame supervision panel 210, a cooling unit 220, and peripheral modules 230 and 240 into a unitary architecture.

Frame supervision panel 210 contains fuses, a circuit breaker, power control circuits, and alarm circuits for peripheral module unit 200. Cooling unit 220 includes a fan or other cooling device capable of maintaining the temperature inside peripheral unit 200 at predefined levels.

Peripheral modules 230 and 240 are preferably higher level peripheral modules 180 (i.e., line group controller 184, digital trunk controller 186, and line trunk controller 188) that perform any of the above-described peripheral module functions. Each of peripheral modules 230 and 240 includes two main units (i.e., UNIT 1 250 and UNIT 0 260 for peripheral module 230, and UNIT 1 270 and UNIT 0 280 for peripheral module 240)). UNITS 1 and 0 for both peripheral modules are identical units that perform the same functions. Two identical units are used in each of peripheral modules 230 and 240 to maintain operation of the peripheral module should one of the units fail. Both units include processing devices for controlling lower level components contained within each unit.

The overall "health" of peripheral modules 230 and 240 is dependent on the service capabilities of each unit within the modules. For example, if one or more components within UNIT 1 270 have critical fault conditions, the overall service capacity of peripheral module 240 may be affected. In this situation, control of peripheral module 240 may be switched from UNIT 1 270 to UNIT 0 280, if UNIT 0 is not experiencing more severe fault conditions, and thus, is in better "health."

The ability to determine fault conditions associated with components of each unit, and ultimately the service capability of each unit, resides in a maintenance arbitrator 290 consistent with the present invention. Maintenance arbitrator 290 includes maintenance arbitration software stored in a memory of the peripheral module for providing localized maintenance using fault toleration, proactive diagnostics, platform independence, and rule-based code behavior modification, described in further detail below with respect to FIG. 4. As shown in FIG. 2, maintenance arbitrator 290 resides in each peripheral module, and more specifically, in each unit of the module. However, maintenance arbitrator 290 can reside in any type of node or module (e.g., duplicated pair nodes, simplex nodes, load-shared nodes, majority logic nodes, etc.) and anywhere within the switch 100 architecture to provide maintenance arbitration functionality.

Figure 3:
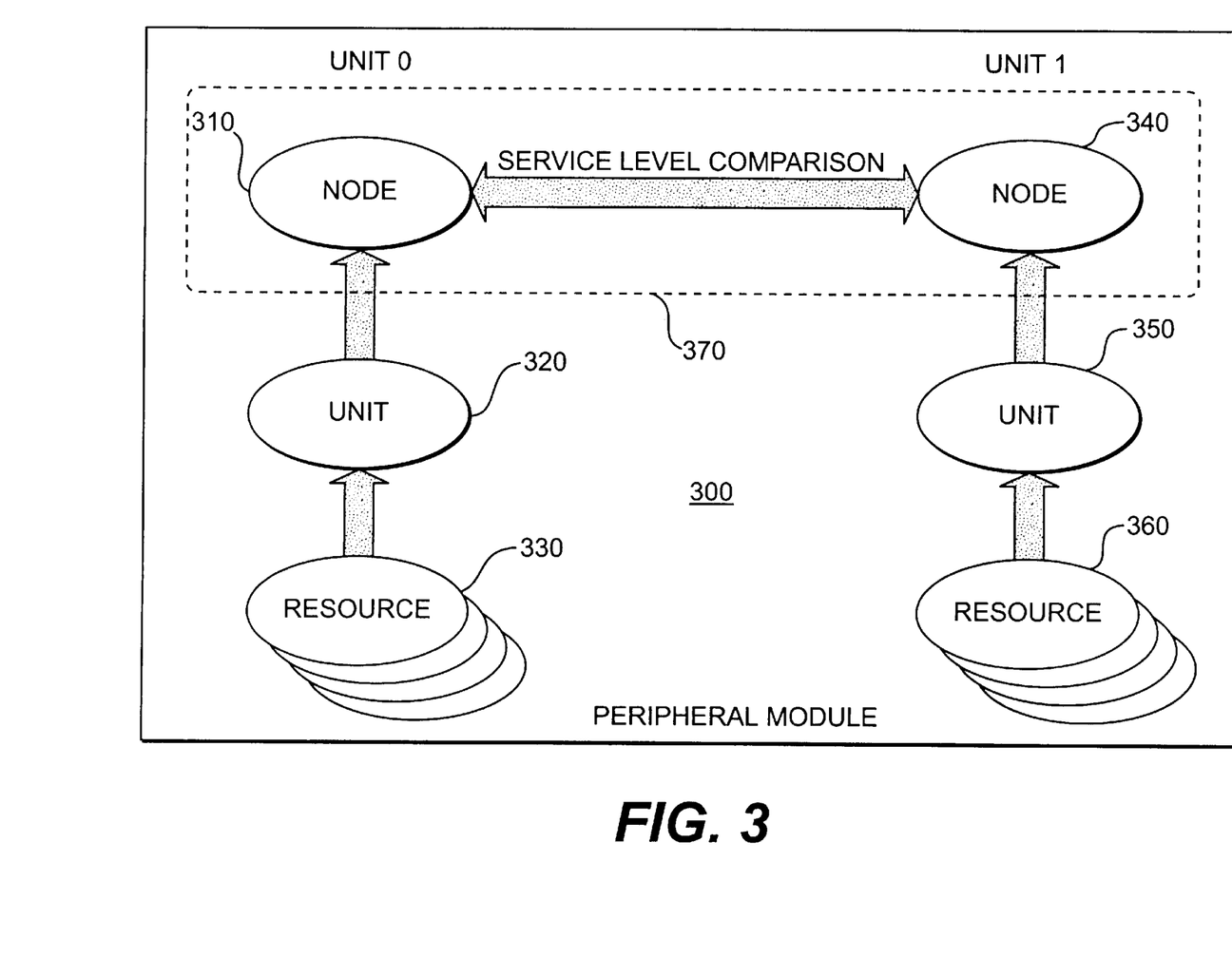
FIG. 3 is a system diagram illustrating peripheral module component levels that use maintenance arbitration functionality consistent with the present invention.

FIG. 3 is a system diagram illustrating peripheral module component levels that use maintenance arbitration functionality consistent with the present invention. Maintenance arbitration functionality provides localized maintenance intelligence and responsibility for each component level associated with peripheral module 300. Each unit of peripheral module 300 has similar maintenance levels. For example, in UNIT 0 illustrated in FIG. 3, the maintenance levels include a node level 310, unit level 320, and resource level 330. Similarly, UNIT 1 includes node level 340, unit level 350, and resource level 360.

Resource levels 330 and 360 include resources (e.g., time switch clock circuits, P-side phase comparator clock, matrix memory, tone source, etc.) which are the smallest physical units within peripheral module 300 that can be tested for fault conditions. These resources support the operation of each unit within peripheral module 300 but can be of varying importance. For example, a ten bit bus may be of greater importance to the peripheral module then a special tone receiver.

Maintenance arbitration functionality allows resources to evaluate their own fault conditions, correct the fault condition when possible, and report the fault conditions to the respective unit controllers at unit levels 320 and 350. In addition, resources can determine the impact of the fault conditions on the resource (i.e., the service capability) and the impact of the fault condition to the unit (i.e., importance level). The resources include this information when reporting to the unit controller. A detailed example of this function is provided below with regard to FIG. 4.

At node maintenance levels 310 and 340, the state of "health" for each unit (i.e., UNIT 0 and UNIT 1) is determined based on the fault condition and service capability information provided by each unit's resources. At node maintenance levels 310 and 340, peripheral module 300 units (i.e., UNIT 0 and UNIT 1) operate as a distributed node 370. Consequently, one unit is capable of determining the state of "health" for the other unit based on the reported fault and service capability information from each unit. If node 370 determines that one unit's state of "health" is significantly better than the other unit, control of peripheral module 300 switches to the better unit. That is, based on a comparison of diagnosed fault conditions and service capabilities associated with each unit, node 370 switches to the unit (e.g., UNIT 1) with the least service affecting problems, rendering one unit active and the other inactive. Whether the state of "health" of a unit is significant may vary based on the unit environment or threshold values programmed into the maintenance arbitrator. If the newly inactive unit (i.e., unit experiencing the fault) is capable of providing any useful level of service, it is kept in standby mode. For example, if the newly active unit experiences a fault which is more service affecting than that of the newly inactive unit, control of the node switches to the better unit (even though the better unit is not capable of providing its maximum level of service). This function avoids a complete outage that would have occurred if the first unit experiencing trouble were automatically taken out of service. Any unit capable of providing useful service is kept in service until manually taken out of service by a technician for repairs. The unit continues to generate periodic alarms and trouble reports until the trouble is repaired.

Figure 4:
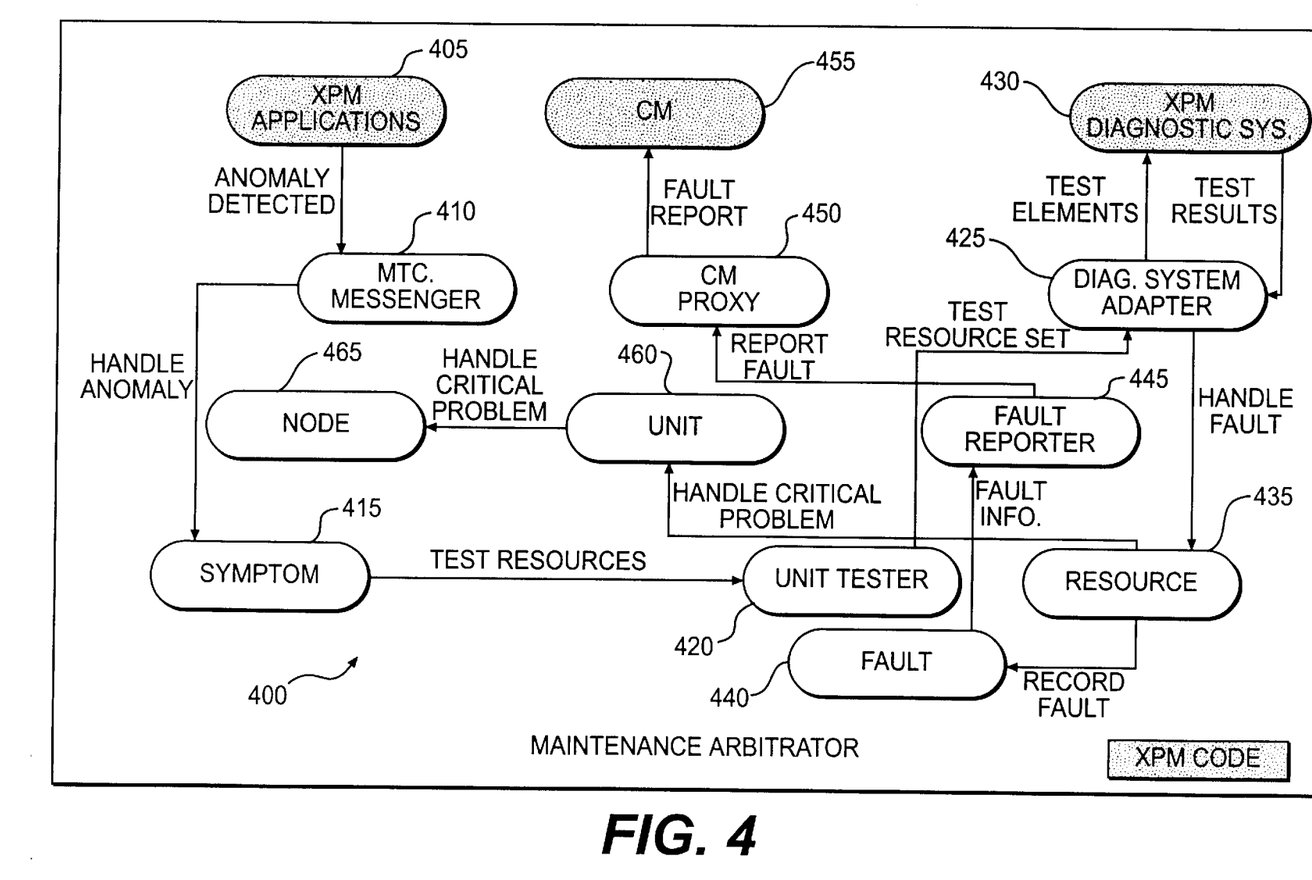
FIG. 4 is a flow diagram illustrating a maintenance arbitration system consistent with the present invention.

FIG. 4 is a flow diagram illustrating a maintenance arbitrator consistent with the present invention. Maintenance arbitrator 400 is platform-independent, object-oriented code (shown in the clear boxes) that applies to software and firmware components of a peripheral module (shown in grey boxes). Being platform-independent, maintenance arbitrator 400 is reusable within a plurality of peripheral modules and other node environments with minimal modification.

The flow diagram of FIG. 4 provides a specific example of how maintenance arbitrator 400 interacts within an Extended Peripheral Module (XPM) manufactured by Nortel. The XPM communicates with a computing module (CM) portion (e.g., CPU 0 of the system core 110 shown in FIG. 1). The CM coordinates, and in some cases controls, the actions of the XPM. Preferably, the XPM includes a XPM Diagnostic System for internal resource testing. Preferably, maintenance arbitrator 400 employs an interface layer to facilitate communication between XPM components (i.e., XPM Applications, CM, and XPM Diagnostic System) and maintenance arbitrator 400 components. In FIG. 4, this layer is represented by the "Mtc. Messenger," "CM Proxy," and "Diag. System Adapter" boxes.

The flow diagram in FIG. 4 begins with the detection of an anomaly within an XPM application (block 405). The anomaly, for example, can be detected when the messaging subsystem of the peripheral module notices that when it tries to send a message to another peripheral node (e.g., Line Controlling Device 182) the message rebounds. Upon detection of this anomaly, a Mtc. Messenger (i.e., maintenance messenger) interface layer application (block 410) reports the anomaly to a Symptom component of maintenance arbitrator 400 (block 415). Assuming that this is the first report of the anomaly, maintenance arbitrator 400 creates a concrete symptom subclass (e.g., XPMPsRbndMsgSym), which records each count of subsequent reports regarding the message rebounding anomaly until the count exceeds a predetermined threshold limit. This function allows the Symptom component to filter through transient signals generated in the peripheral module. The subsequent reports include a Symptom identifier representing the concrete Symptom subclass created for the anomaly.

Once the threshold is exceeded, the Symptom component sends a "Test Resources" message to or invokes a "Test Resources" program in a Unit Tester component of maintenance arbitrator 400 (block 420). The message includes a list of suspected resources within the peripheral module that may be faulty. The list of suspected resources would identify resources of the peripheral module that, for example, are part of the messaging subsystem or used by the messaging subsystem to perform its operation. The Unit Tester component queries each resource to determine if any of the resources have an existing fault that could be causing the anomaly. If a fault already exists, the Unit Tester invokes a "fault-found" procedure associated with the symptom and no further resource testing is conducted. If no faults are reported, Unit Tester builds a test resource set and sends it to a Diagnostic System Adaptor interface layer application requesting that the set of resources be tested (block 425).

The Diagnostic System Adaptor first queues the request and then sends it to the XPM Diagnostic System of the peripheral module (block 430). When the XPM Diagnostic System receives the test request, it determines the tests to run for each resource based on the elements identified in the test request, performs the necessary testing, and, if any faults are detected, isolates the fault conditions to a specific resource. After testing, the XPM Diagnostic System sends the test results back to the Diagnostic System Adapter (block 425). The test results can indicate a hard fault or a transient error in one or more of the resources, or no errors in any resource.

If the XPM Diagnostic System locates a fault in one or more resources, the Diagnostic System Adapter determines the seriousness of the fault based on predetermined criteria (e.g., minor, major, or critical) and notifies all tested Resources of their test results (block 435). For example, the notification may identify the fault type as "hard", the service degradation level as "critical," and include a list of replaceable cards. Assuming that the test results indicate a faulty resource, a Fault component of the maintenance arbitrator records the identified fault condition (block 440). The Fault component reports the fault condition to a Fault Reporter component (block 445). Depending on the severity of the fault, the Fault Reporter component periodically generates alarm and fault information (e.g., minor, major, critical) and reports this information along with the fault condition of the resource to a CM Proxy interface layer application (block 450). The CM Proxy application converts the report into a format readable by a peripheral module controller. Fault Reporter component continues reporting the fault information to the CM Proxy application until the fault is corrected. Upon receipt of a fault report, the CM Proxy application forwards the fault and alarm information to the CM in readable form (block 455).

If the service level changes as a result of the fault, the Resource reports this change to its associated Unit (block 460). The report includes the resource's previous level of service, previous service importance level, its current service level, and its new service importance level. The service level is the service capability of the resource and the service importance level is the resource's level of importance to the operation of the peripheral module. If there is no change in the resource's service level, the Resource does not notify the Unit. If the Resource can make self-adjustments to reduce the impact of or isolate the fault further (e.g. switching to a back-up device), it does so prior to reporting the service degradation information to the Unit.

The Unit checks the Resource's report to determine if the service level has degraded or improved. If the service level is unchanged, the Unit compares the previous and current service importance levels to determine if the service importance level has degraded or improved (e.g., service importance level has degraded if the current importance level is greater than the previous level). The Unit reports service degradations to its associated Node immediately, supplying both previous and current service level and service importance level values (block 465). However, the Unit does not report an improvement in its state of "health" unless a predetermined time interval expires without receiving indication that the fault still exists. Once the improvement has been verified (via stability timing), the Unit reports the improvement to the Node. The Node communicates the changes to the other Unit and compares the state of "health" between the two units. If the difference in the two unit's individual "health" state is significant, peripheral module control is switched, if necessary, to the unit with the better state of "health."

If the fault is critical and the Resource is critical, then the Resource experiencing the fault condition immediately reports the condition to the Unit. The Unit then determines if this is the first critical problem. If so, the Unit reports the change to the Node resulting in peripheral module operation switching automatically to the other Unit. If the critical problem became non-critical and no other critical problems exist, the Unit recovers itself.

Figure 5:
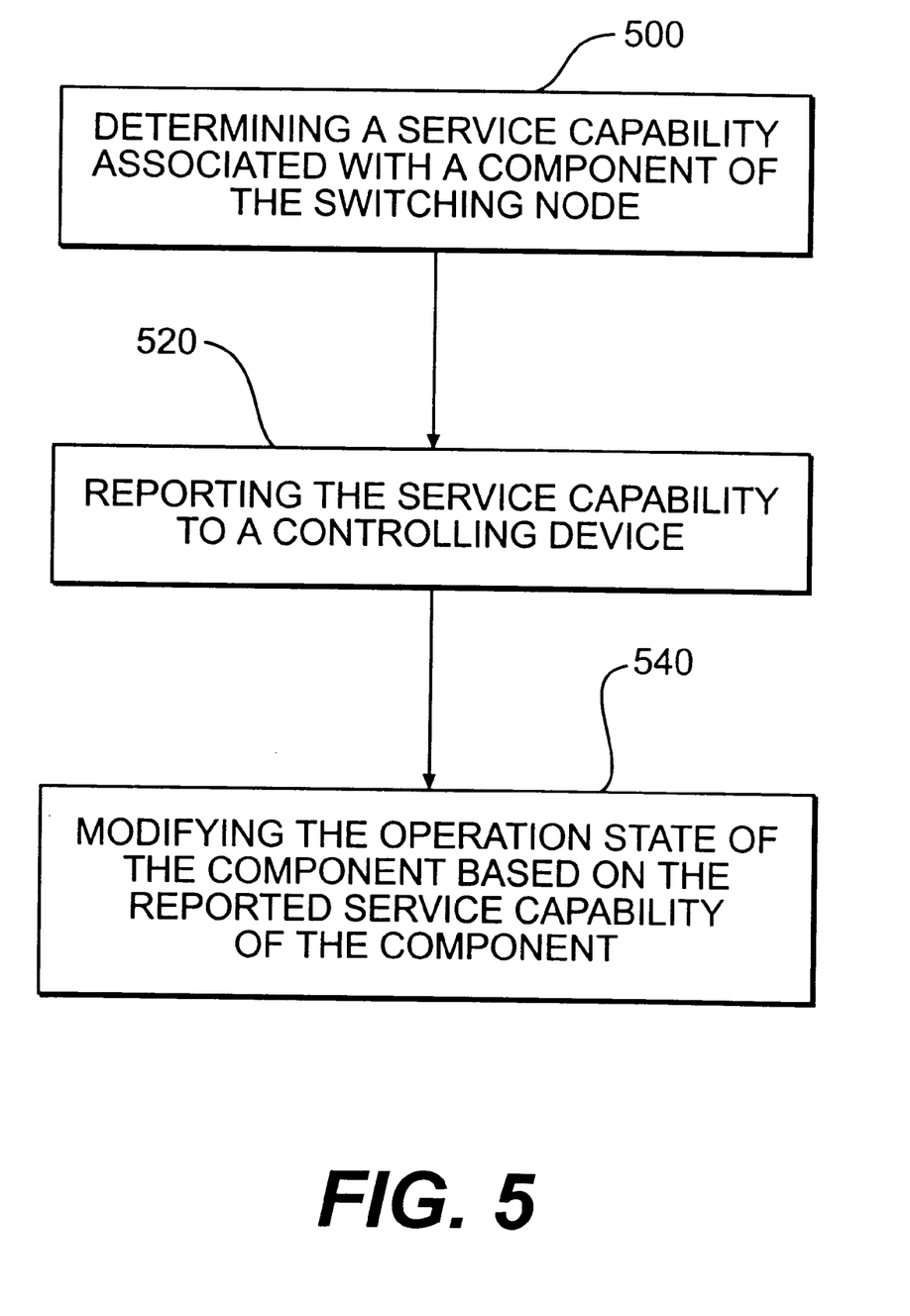
FIG. 5 is a flowchart of a maintenance arbitration method consistent with the present invention.

FIG. 5 is a flowchart of a maintenance arbitration method consistent with the present invention. The method begins with determining a service capability associated with a component of the switching node (step 500). In this step, the service capability takes into account any fault conditions existing within the component that may impact service capability. Subsequently, the component reports its service capability to a controlling device, such as a device controlling the component (step 520). Finally, the controlling device modifies the operation state of the component based on the reported service capability (step 540).

Figure 6:
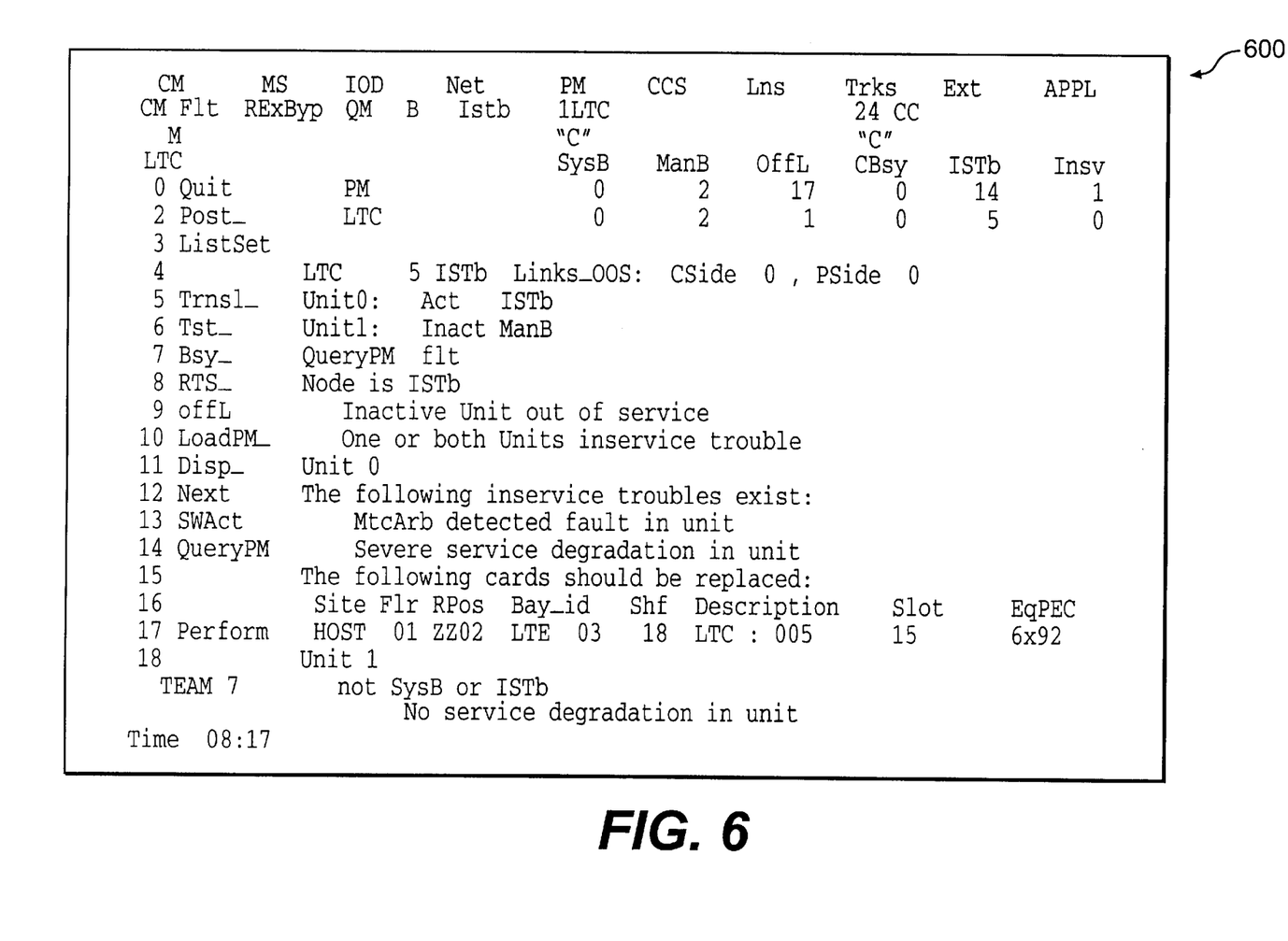
FIG. 6 is an example fault information display generated by a maintenance arbitrator consistent with the present invention.

FIG. 6 is an example fault information display 600 generated by a maintenance arbitrator consistent with the present invention. When a unit reports a fault condition to the peripheral module node, maintenance arbitration software consistent with the present invention generates a video display screen that provides critical information about the fault condition to a technician. For example, at lines 5 and 6, the display identifies the state of each unit within the peripheral module (i.e., Unit0 is active and Unit1 is inactive). Lines 9 and 10 indicate that the inactive unit (i.e., Unit 1) is out of service and that one or more of the units is experiencing "in service trouble." Specifically, lines 11–14 indicate that the maintenance arbitration software "MtcArb" has detected a fault in Unit0 resulting in "severe service degradation in the unit." In addition to notifying the technician of the location of the fault, the maintenance arbitration software identifies the cards within Unit0 that require replacement, as shown on lines 15–17. Current switching node maintenance systems do not offer these self-diagnosing and reporting features.

As described above, the maintenance arbitration system consistent with the present invention provides localized maintenance using fault toleration, proactive diagnostics, platform independence, and rule-based code behavior modification. That is, maintenance arbitration software determines whether a fault existing in a resource object is tolerable based on the resource's critically to the overall operation of the peripheral module. In addition, maintenance arbitration software constantly monitors and reports faults to a unit controller in order to correct the faults before they reach critical levels. Furthermore, the maintenance arbitration software is platform independent such that it can be used in a virtually any node requiring an internal or external maintenance component. Being platform independent, maintenance arbitrator software can be easily modified to include additional software features as necessary. Finally, the maintenance arbitration software described herein is rule-based such that code behavior can be changed (e.g., by modifying threshold values) without actually changing the code.

While there has been illustrated and described to be preferred embodiments and methods of the present invention, those skilled in the art will understand that various changes and modifications may be made, and equivalents may be substituted for elements thereof, without departing from the true scope of the invention.

In addition, many modifications may be made to adapt a particular element, technique or implementation to the teachings of the present invention without departing from the central scope of the invention. Therefore, this invention should not be limited to the particular embodiments and methods disclosed herein, but should include all embodiments falling within the scope of the appended claims.

What is claimed is:

1. A system for providing localized maintenance arbitration at a switching node having a plurality of components, comprising:
   means for determining a service capability associated with a component of the switching node;
   means for reporting the service capability to a controlling device; and
   means for modifying the operation state of the component based on the reported service capability of the component;
   wherein the resorting means periodically updates the service capability associated with the component and sends the service capability to the controlling device after each update.

2. The system of claim 1 wherein the determining means include means for determining the service capability of a peripheral module.

3. The system of claim 2 wherein the peripheral module includes a first controlling device, a second controlling device, and a resource unit, each of the controlling devices being capable of controlling the operation of the peripheral module.

4. The system of claim 3 wherein the first controlling device includes means for ascertaining the service capability of the second controlling device.

5. The system of claim 3 wherein the second controlling device includes means for ascertaining the service capability of the first controlling device.

6. The system of claim 3 wherein the first controlling device includes means for switching peripheral module operation control to the second controlling device.

7. The system of claim 3 wherein the second controlling device includes means for switching peripheral module operation control to the first controlling device.

8. The system of claim 3 wherein the first controlling device includes means for ascertaining a service capability of the resource unit.

9. The system of claim 3 wherein the second controlling device includes means for ascertaining a service capability of the resource unit.

10. The system of claim 3 wherein each of the controlling devices includes means for testing the resource unit for a fault condition.

11. The system of claim 10 wherein each of the controlling devices includes means for responding to the fault condition by changing the operation state of the resource unit.

12. The system of claim 1 wherein the determining means includes means for comparing a fault condition to a predetermined symptom.

13. The system of claim 12 wherein the modifying means includes means for correcting the fault condition based on a predetermined solution to the predetermined symptom.

14. A peripheral module associated with a switching node of a communication network, comprising:
   a controller;
   a resource unit in communication with the controller;
   means for periodically monitoring a change in the peripheral module service capability by detecting a fault condition associated with the resource unit; and
   means for periodically modifying peripheral module operation to overcome the change in peripheral module service capability based on the detected fault condition.

15. The module of claim 14 wherein the controller includes a first controlling device and a second controlling device, each of the controlling devices capable of controlling peripheral module operation.

16. The module of claim 15 wherein the first controlling device includes means for ascertaining the service capability of the second controlling device.

17. The module of claim 15 wherein the second controlling device includes means for ascertaining the service capability of the first controlling device.

18. The module of claim 15 wherein the first controlling device includes means for switching peripheral module operation control to the second controlling device.

19. The module of claim 15 wherein the second controlling device includes means for switching peripheral module operation control to the first controlling device.

20. The module of claim 15 wherein the first controlling device includes means for ascertaining a service capability of the resource unit.

21. The module of claim 15 wherein the second controlling device includes means for ascertaining a service capability of the resource unit.

22. The module of claim 20 wherein each of the controlling devices includes means for testing the resource unit for a fault condition.

23. The module of claim 22 wherein each of the controlling devices includes means for responding to the fault condition by changing the operation state of the resource unit.

24. The module of claim 14 further including means for communicating with a component of the switching node to inform the component of a peripheral module operation state change.

25. The module of claim 15 wherein each the controlling devices include a memory.

26. The module of claim 25 wherein the memory includes controller software.

27. The module of claim 26 wherein the controller software includes code that is reusable with a plurality of peripheral modules associated with the switching node.

28. A switching node connected to a communication network, comprising:
   a controller;
   a plurality of peripheral modules in communication with the controller;
   means for monitoring a service capability status associated each of the plurality of peripheral modules;
   means for continuously updating the service capability status of the peripheral module and reporting the service capability status of the peripheral module to the controller; and
   means for modifying the operation state of the peripheral module based on the received service capability status.

29. A method for providing localized maintenance arbitration at a switching node having a plurality of components, comprising the steps of:
   determining a service capability associated with a component of the switching node;
   reporting the service capability to a controlling device, including periodically updating the service capability of the component and sending the service capability of the component to the controlling device after each update; and
   modifying the operation state of the component based on the reported service capability of the component.

30. The method of claim 29 wherein the determining step includes the step of running a self-diagnostic test on the component to determine the service capability of the component.

31. The method of claim 29 wherein the determining step includes the step of running a self-diagnostic test on the component to detect the fault condition.

32. A method for providing localized maintenance arbitration at a switching node having a plurality of components, comprising the steps of:
   determining a service capability associated with a component of the switching node;
   reporting the service capability to a controlling device, including requesting a service capability report from the component and sending the service capability report in response to the request; and
   modifying the operation state of the component based on the reported service capability of the component.

33. The method of claim 29 wherein the modifying step includes the step of changing the operation status of the component from active to inactive.

34. The method of claim 29 wherein the determining step includes the step of detecting a fault condition before the fault condition renders the component inoperable.

35. The method of claim 29 wherein the determining step includes the step of determining a service capability associated with a first controlling device and a second controlling device.

36. The method of claim 35 wherein the determining step includes the step of detecting a fault condition associated with each of the first and second controlling devices.

37. The method of claim 35 further comprising the steps of:
   comparing the service capability of the first and second controlling devices; and
   selecting one of the first and second controlling devices to control the operation of a peripheral module associated with the switching node based on which controlling device has higher service capability.

38. The method of claim 36 further comprising the steps of:
   comparing the fault condition of the first and second controlling devices; and
   selecting one of the first and second controlling devices to control the operation of a peripheral module associated with the switching node based on which controlling device has a lower fault condition.

39. A system for providing localized maintenance arbitration at a switching node having a plurality of components, comprising:
   means for determining a service capability associated with a component of the switching node;
   means for reporting the service capability to a controlling device; and
   means for modifying the operation state of the component based on the reported service capability of the component;
   wherein the means for reporting requests a service capability report from the component.

40. A computer program product comprising:
   a computer usable medium having computer readable code embodied therein for providing localized maintenance arbitration at a switching node having a plurality of components, the computer usable medium comprising:
   a module for determining a service capability associated with a component of the switching node;
   a module for requesting a service capability report from the component and reporting the service capability controlling device; and
   a module for modifying the operation state of the component based on the reported service capability of the component.

41. A computer program product comprising:
   a computer usable medium having computer readable code embodied therein for providing localized maintenance arbitration at a switching node having a plurality of components, the computer usable medium comprising:
   a module for determining a service capability associated with a component of the switching node;
   a module for periodically updating the service capability associated with the component and sending the service capability to a controlling device after each update; and
   a module for modifying the operation state of the component based on the reported service capability of the component.

42. A peripheral module associated with a switching node of a communication network, comprising:
   a resource unit;
   a test unit to periodically monitor a change in the peripheral module service capability by detecting a fault condition associated with the resource unit;
   a controller to periodically modify the peripheral module operation to overcome the change in peripheral module service capability based on the detected fault condition.

43. A system for providing localized maintenance arbitration at a switching node having a plurality of components, comprising:
   a test unit to determine a service capability associated with a component of the switching node;
   a reporting unit to periodically update the service capability associated with the component and to report the service capability to a controlling device after each update;
   wherein the controlling device modifies the operation state of the component based on the reported service capability of the component.

* * * * *